(12) United States Patent
Preuss et al.

(10) Patent No.: US 11,815,022 B2
(45) Date of Patent: Nov. 14, 2023

(54) PLATFORM SERPENTINE RE-SUPPLY

(71) Applicant: Raytheon Technologies Corporation, Farmington, CT (US)

(72) Inventors: Daniel P. Preuss, Glastonbury, CT (US); Dominic J. Mongillo, Jr., West Hartford, CT (US); Timothy J. Jennings, New Britain, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/882,114

(22) Filed: Aug. 5, 2022

(65) Prior Publication Data
US 2023/0037659 A1   Feb. 9, 2023

Related U.S. Application Data

(60) Provisional application No. 63/230,424, filed on Aug. 6, 2021.

(51) Int. Cl.
*F01D 5/18* (2006.01)
*F02C 7/18* (2006.01)
*F01D 25/12* (2006.01)
*F02C 3/06* (2006.01)

(52) U.S. Cl.
CPC .................. *F02C 7/18* (2013.01); *F01D 5/18* (2013.01); *F01D 25/12* (2013.01); *F02C 3/06* (2013.01); *F05D 2220/323* (2013.01); *F05D 2240/12* (2013.01); *F05D 2240/30* (2013.01); *F05D 2260/232* (2013.01)

(58) Field of Classification Search
CPC . F01D 5/18; F01D 5/084; F01D 5/085; F01D 5/187; F01D 9/04; F05D 2240/81; F05D 2260/20; F02C 6/08
See application file for complete search history.

(56) References Cited

U.S. PATENT DOCUMENTS

| | | | | |
|---|---|---|---|---|
| 4,798,515 A | * | 1/1989 | Hsia | F01D 5/189 415/115 |
| 6,231,303 B1 | * | 5/2001 | Tiemann | F01D 11/24 415/117 |
| 7,306,424 B2 | * | 12/2007 | Romanov | F01D 11/08 415/173.1 |
| 9,303,518 B2 | | 4/2016 | Willey et al. | |

(Continued)

FOREIGN PATENT DOCUMENTS

CN         210948909 U      7/2020

OTHER PUBLICATIONS

European Search Report for European Application No. 22189275.5 dated Dec. 1, 2022.

*Primary Examiner* — Thuyhang N Nguyen
(74) *Attorney, Agent, or Firm* — Carlson, Gaskey & Olds, P.C.

(57) ABSTRACT

A gas turbine engine includes a compressor section that provides first and second compressor stages that are configured to respectively provide first and second cooling fluids. The first compressor stage has a higher pressure than the second compressor stage. The gas turbine engine further includes a component that has platform with an internal cooling passage fed by first and second inlets that respectively receive fluid from the first and second cooling sources. The second inlet is downstream from the first inlet.

14 Claims, 4 Drawing Sheets

(56) References Cited

U.S. PATENT DOCUMENTS

| | | | |
|---|---|---|---|
| 9,500,099 B2 | 11/2016 | Spangler et al. | |
| 10,287,906 B2 * | 5/2019 | Rice | F01D 9/04 |
| 10,502,092 B2 | 12/2019 | Bergman | |
| 10,662,780 B2 | 5/2020 | LoRicco et al. | |
| 2004/0088995 A1 * | 5/2004 | Reissig | F02C 7/185 |
| | | | 60/772 |
| 2009/0196736 A1 * | 8/2009 | Sengar | F02C 6/08 |
| | | | 415/115 |
| 2014/0047843 A1 | 2/2014 | Papple et al. | |
| 2016/0115803 A1 * | 4/2016 | Papple | F01D 9/041 |
| | | | 415/115 |

* cited by examiner

PLATFORM SERPENTINE RE-SUPPLY

CROSS REFERENCE TO RELATED APPLICATION

This application claims priority to U.S. Provisional Application No. 63/230,424 filed on Aug. 6, 2021.

TECHNICAL FIELD

The present disclosure relates to cooling structures for gas turbine engines, and, more specifically, to airfoil cooling structures.

BACKGROUND

A gas turbine engine typically includes a fan section, a compressor section, a combustor section, and a turbine section. A fan section may drive air along a bypass flow path while a compressor section may drive air along a core flow path. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines. The turbine section includes multiple stages of blades and vanes. As fluid flows through the turbine section, the flow causes the blades to rotate about an axis of rotation. The vanes, positioned between each row of blades, are used to redirect the flow in order to maximize the power received by the downstream blades.

Temperatures within the turbine section may be relatively high, as the flow of fluid is received initially from the combustor section of the gas turbine engine. Cooling air may be extracted from the compressor section and used to cool the gas path components. Cooled components may include, for example, rotating blades and stator vanes in the turbine section.

Both the compressor and turbine sections of the gas turbine engine may include alternating rows of rotating blades and stationary vanes that extend into the core flow path of the gas turbine engine. For example, in the turbine section, turbine blades rotate to extract energy from the hot combustion gases that are communicated along the core flow path of the gas turbine engine. The turbine vanes prepare the airflow for the next set of blades. These blades and vanes are examples of components that may need cooled by a dedicated source of cooling airflow in order to withstand the relatively high temperatures of the hot combustion gases that are communicated along the core flow path.

SUMMARY

In one exemplary embodiment, a gas turbine engine includes a compressor section that provides first and second compressor stages that are configured to respectively provide first and second cooling fluids. The first compressor stage has a higher pressure than the second compressor stage. The gas turbine engine further includes a component that has platform with an internal cooling passage fed by first and second inlets that respectively receive fluid from the first and second cooling sources. The second inlet is downstream from the first inlet.

In a further embodiment of any of the above, the compressor section includes a high pressure compressor section that is downstream from a low compressor section. A combustor section is arranged fluidly between the high pressure compressor section and a turbine section. The component is arranged in the turbine section, which has a first path side and a second path side. The second path side is exposed to a core flow path that extends through the compressor section, the combustor section and the turbine section.

In a further embodiment of any of the above, the component is a turbine vane.

In a further embodiment of any of the above, the turbine vane includes a hollow airfoil that is configured to receive a third cooling fluid from the compressor section and different from the first and second cooling fluids.

In a further embodiment of any of the above, the component has longitudinally spaced apart forward and aft rails that support the platform. The first inlet is provided in the forward rail.

In a further embodiment of any of the above, the internal cooling passage is a serpentine cavity that has a pressure drop. The second inlet is arranged downstream of the pressure drop.

In a further embodiment of any of the above, a cover plate is secured over the serpentine on the first gas path side. The cover plate provides the second inlet.

In a further embodiment of any of the above, the second inlet is provided by a cluster of holes through the cover plate.

In a further embodiment of any of the above, the serpentine cavity includes a plurality of cooling augmentation features.

In a further embodiment of any of the above, the cooling augmentation features include at least one of trip strips, pin fins and chevrons.

In a further embodiment of any of the above, the cooling augmentation features are arranged fluidly between the first and second inlets.

In a further embodiment of any of the above, the first and second cooling fluids are provided by bleed air from the high pressure compressor section.

In another exemplary embodiment, a gas turbine engine includes a compressor section that includes a high pressure compressor section downstream from a low compressor section. The high pressure compressor section provides first and second compressor stages that are configured to respectively provide bleed air that supplies first and second cooling fluids. The first compressor stage has a higher pressure than the second compressor stage. The gas turbine engine also includes a combustor section that is arranged fluidly between the high pressure compressor section and a turbine section. A core flow path extends through the compressor section, the combustor section and the turbine section. The gas turbine engine further includes a component that is arranged in the turbine section and has a platform with an internal cooling passage that is fed by first and second inlets that respectively receive fluid from the first and second cooling sources. The second inlet is downstream from the first inlet.

In a further embodiment of any of the above, the component is a turbine vane.

In a further embodiment of any of the above, the turbine vane includes a hollow airfoil that is configured to receive a third cooling fluid from the compressor section and different from the first and second cooling fluids.

In a further embodiment of any of the above, the turbine vane has a first path side and a second path side. The second path side is exposed to the core flow path. The turbine vane has longitudinally spaced apart forward and aft rails that support the platform. The first inlet is provided in the forward rail.

In a further embodiment of any of the above, the internal cooling passage is a serpentine cavity that has a pressure drop. The second inlet is arranged downstream of the pressure drop.

In a further embodiment of any of the above, a cover plate is secured over the serpentine on the first gas path side. The cover plate provides the second inlet.

In a further embodiment of any of the above, the second inlet is provided by a cluster of holes through the cover plate.

In a further embodiment of any of the above, the serpentine cavity includes a plurality of cooling augmentation features. The cooling augmentation features include at least one of trip strips, pin fins and chevrons. The cooling augmentation features are arranged fluidly between the first and second inlets.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
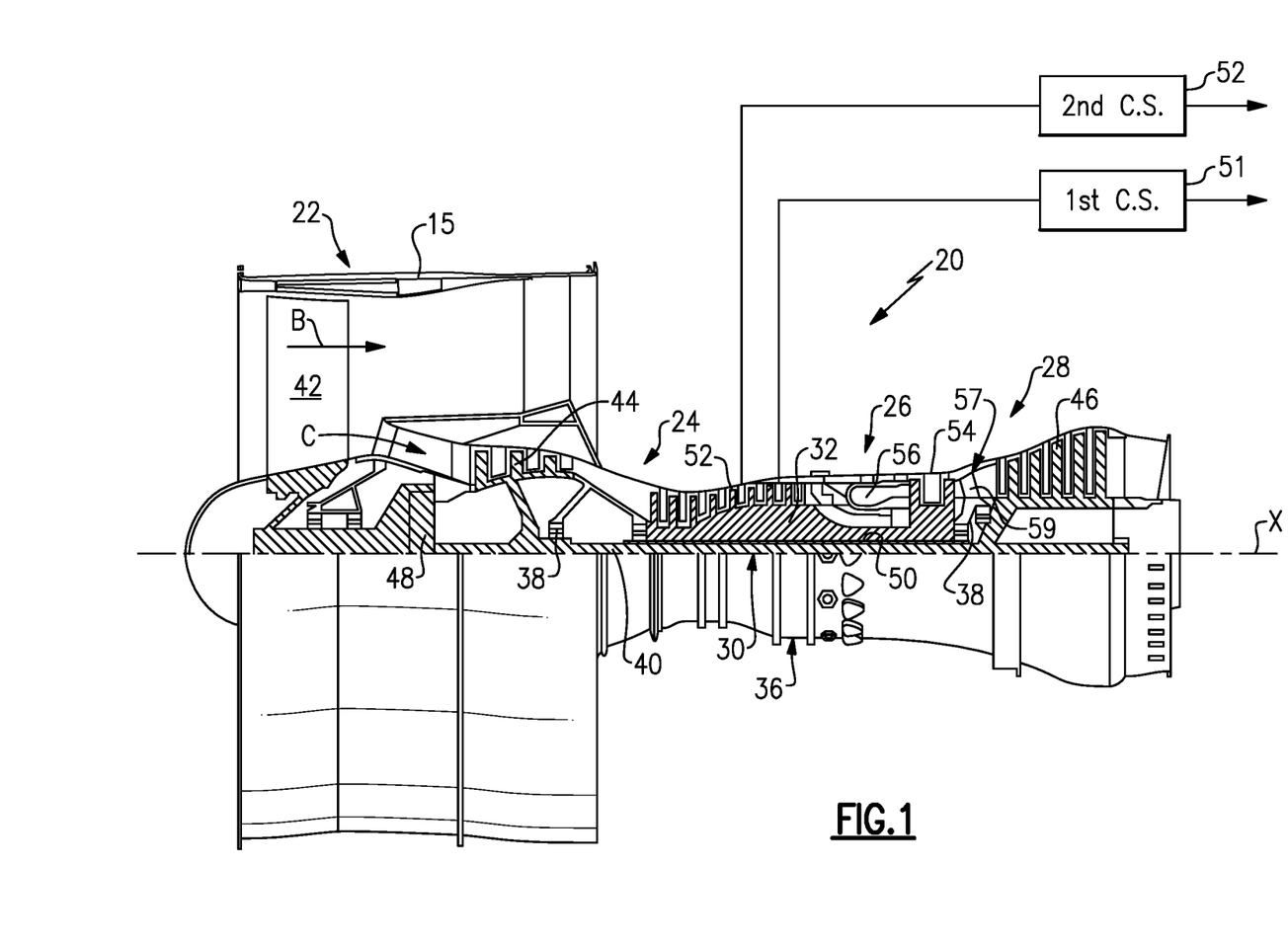
FIG. 1 illustrates a cross-sectional view of an exemplary gas turbine engine, in accordance with various embodiments.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The low gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
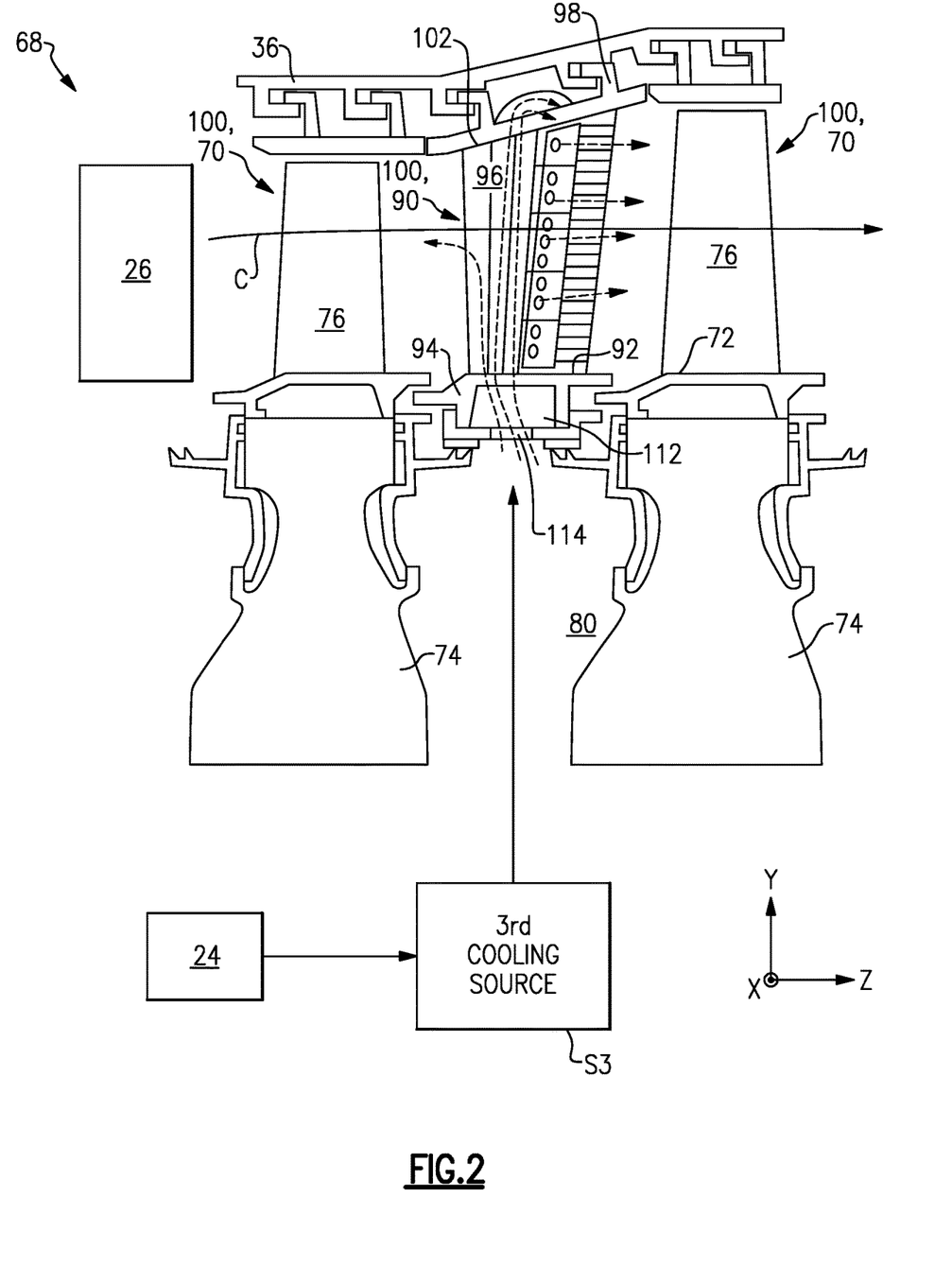
FIG. 2 illustrates an engine section including example airfoils, such as a blade and a vane of an exemplary gas turbine engine, according to various embodiments.

Referring now to FIG. 1 and to FIG. 2, according to various embodiments, each of low pressure compressor 44, high pressure compressor 52, low pressure turbine 46, and high pressure turbine 54 in gas turbine engine 20 may comprise one or more stages or sets of rotating blades and one or more stages or sets of stationary vanes axially interspersed with the associated blade stages but non-rotating about engine central longitudinal axis X. Each compressor stage and turbine stage may comprise multiple interspersed stages of blades 70 and vanes 90. The blades 70 rotate about engine central longitudinal axis X, while the vanes 90 remain stationary with respect to engine central longitudinal axis X. Blades 70 and vanes 90 may be referred to as airfoils 100. For example, FIG. 2 schematically shows, by example, a portion of an engine section 68, which is illustrated as a turbine section 28 of gas turbine engine 20.

With reference to FIG. 2, a schematic view of a portion of engine section 68 is shown, in accordance with various embodiments. Engine section 68, which may be a turbine section 28, includes a circumferential array of blades 70 coupled about a circumference of a generally circular disk 74. Disk 74 may be disposed radially inward of core flowpath C and centered on the rotation axis of the gas turbine engine. Disk 74 with blades 70 may be configured to rotate about engine central longitudinal axis X. Each blade 70 may include an airfoil body 76 with a platform disposed at an inner diameter end wall 72 of the blade 70. A disk cavity 80 may be defined between a forward disk and an aft disk. Upstream (forward) and downstream (aft) of blades 70 are circumferential arrays of vanes 90 configured to guide core flowpath C through the engine section 68.

Each vane 90 may include an airfoil body 96 with an inner diameter platform 94 disposed at an inner diameter end wall 92 of vane 90 and with an outer diameter platform 98 disposed at an outer diameter end wall 102 of vane 90. Outer diameter platform 98 may be coupled to engine case structure 36. Inner diameter platform 94 and/or outer diameter platform 98 may be coupled to or integral with vane 90.

The turbine section 28, particularly the stages immediately downstream from the combustor section 26, experience extreme heat such that that cooling must be provided to one or more components of the turbine section 28, for example, vanes, platforms and/or blade outer air seals (BOAS). In the example shown in FIGS. 1-3, first, second and third cooling sources S1, S2, S3 supply cooling fluid to the turbine section. These cooling sources are fed bleed air from the compressor section, for example, from one or more compressor stages of the HPC 52.

Figure 3:
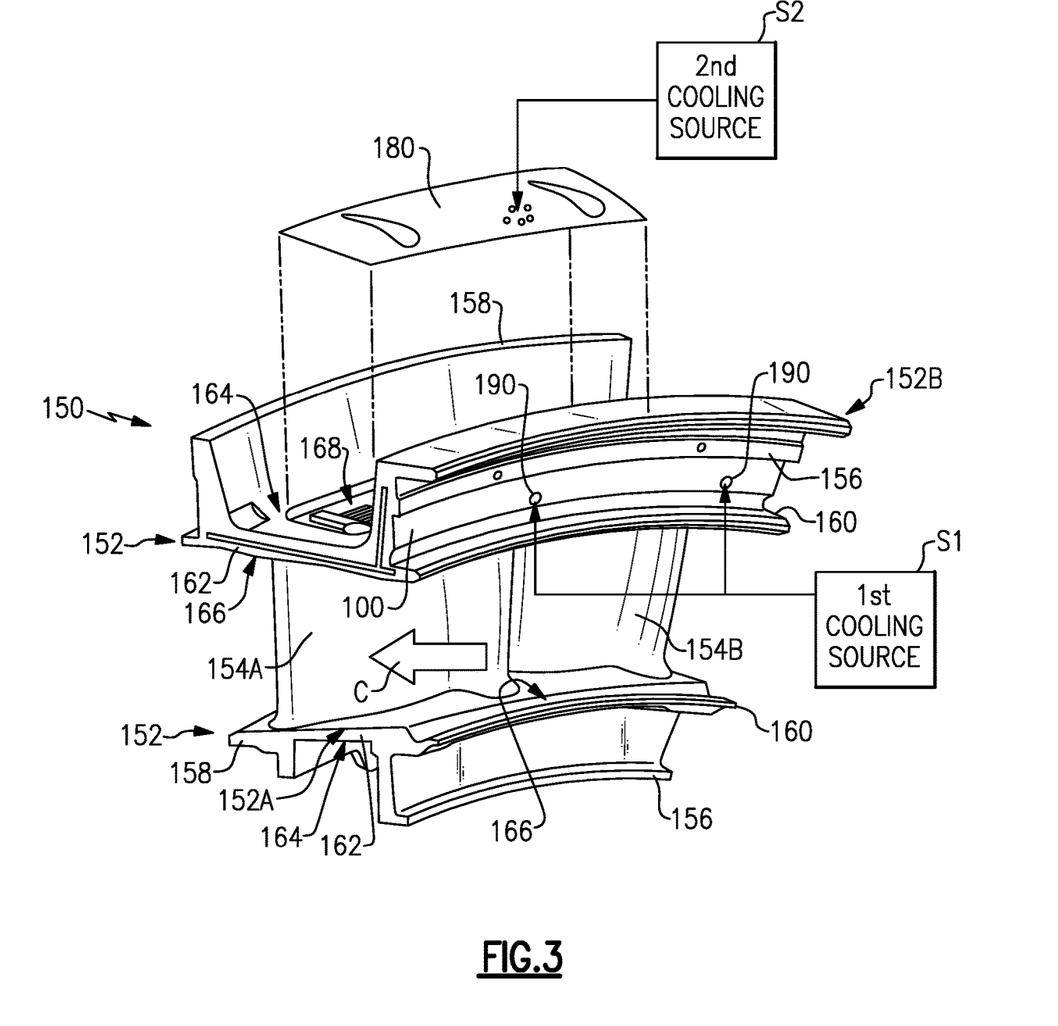
FIG. 3 illustrates a component that can be incorporated into a gas turbine engine.

In various embodiments and with reference to FIG. 3 and still to FIG. 2, vane 90 may comprise an internal cooling system to convectively remove heat from the airfoil body 96 of vane 90. A secondary airflow path may be defined within disk cavity 80 and may contain a third cooling fluid from third cooling source S3. This third cooling fluid may be routed in any suitable manner. The cooling fluid, such as bleed air, may be introduced into a cavity 112 of inner diameter platform 94 through an orifice 114 in inner diameter platform 94. In various embodiments, the coolant may flow into a vane via a vane outer diameter cavity. Blade 70 may similarly include an internal cooling system. However, it should be understood that the component cooled according to the disclosed platform serpentine resupply configuration may be arranged differently than shown and described.

FIG. 3 illustrates a component 150 that can be incorporated into a gas turbine engine, such as the gas turbine engine 20 of FIG. 1. In this embodiment, the component 150 is a turbine vane, such as the vane 90 illustrated in FIG. 2. However, this disclosure is not limited to turbine vanes and could extend to other components of the gas turbine engine 20, including but not limited to, compressor blades and vanes, turbine blades, blade outer air seals (BOAS), mid-turbine frames, transition ducts, or any other component that extends within the core flow path C.

The component 150 can include one or more platforms 152 and one or more airfoils 154 that extend from the platform(s) 152. In this particular embodiment, the component 150 includes an inner diameter platform 152A and an outer diameter platform 152B as well as two airfoils 154A, 154B that extend between the inner and outer platforms 152A, 152B. Although illustrated as a vane doublet, it should be understood that vane singlets or other vane assemblies may benefit from the teachings of this disclosure, and that non-airfoil components, such as BOAS or transition ducts, may also benefit from these teachings.

The platform(s) 152 include a leading edge portion 156 providing a forward rail, a trailing edge portion 158 providing an aft rail, and opposing mate faces 160, 162. The platform(s) 152 axially extend between the leading edge portion 156 and the trailing edge portion 158 and circumferentially extend between the opposing mate faces 160, 162. The opposing mate faces 160, 162 can be mounted relative to corresponding mate faces of adjacent components of a gas turbine engine to provide a full ring assembly, such as a full ring vane assembly that can be circumferentially disposed about the engine centerline longitudinal axis X (see FIG. 1).

The platforms can also include a first path side (for example, a non-gas path side) 164 and a second path side (for example a gas path side) 166. In other words, when the component 150 is mounted within the gas turbine engine 20, the non-gas path side 164 is positioned on a non-core flow path side of the component 150, while the gas path side 166 may establish an outer boundary of the core flow path C of the gas turbine engine 20.

Figure 4A:
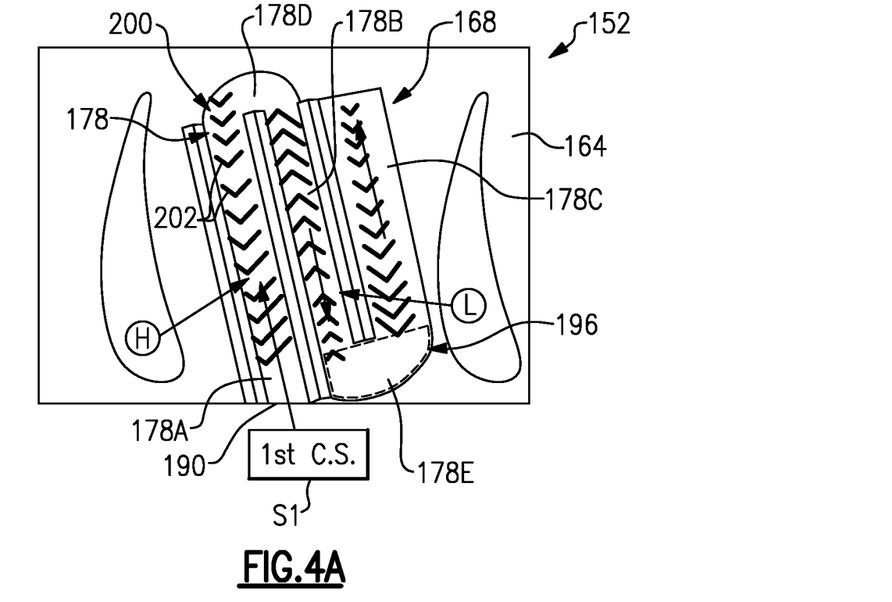
FIGS. 4A and 4B depict top views respectively of a platform serpentine cooling passage and a cover plate.

One or both of the platforms 152 can also include a platform cooling circuit 168 for cooling the platform 152. One exemplary platform cooling circuit 168 is illustrated in FIG. 4A. The platform cooling circuit 168 is disposed on the non-gas path side 164 of the platform 152. In this embodiment, the platform 152 could be representative of either an inner diameter platform or an outer diameter platform of a vane, or could be a platform of some other component, including but not limited to, a blade or a BOAS.

The exemplary platform cooling circuit 168 provides a serpentine cavity 178 including generally longitudinal portions 178A, 178B, 178C fluidly connected by bends 178D, 178E. One or more of these portions may include cooling augmentation features 200 to further improve cooling to the platform 152. Cooling augmentation features include, for example, chevrons, trip strips, pin fins or other turbulent flow-inducing features that enhance heat transfer.

A cover plate 180 positioned at the non-gas path side 164 of the platform 152 over the serpentine cavity. It should be understood that the platform cooling circuit 168 could be configured to provide a variety of flow paths based upon the cooling desired from this internal cooling passage and is not necessarily limited to the particular configuration shown in FIG. 3. Additionally, a separate cover plate 180 can instead be integrally formed with the platform 152, such that a wax core or other technique is used to form the internal cooling passage.

In this embodiment, the cover plate 180 (FIG. 4B) is positioned to cover the serpentine cavity 178 to define an enclosed cooling passage therein. The cover plate 180 may be brazed or welded onto the non-gas path side 164 of the platform 152. The cover plate 180 may be shaped similar to the serpentine cavity 178.

The serpentine cavity 178 is fed by a first inlet 190 that is supplied a first cooling fluid from the first cooling source S1. As the first cooling fluid flows from the first inlet 190 to the downstream portions, there is a pressure drop from a high pressure region H to a relatively lower pressure region L. The pressure may become low as the flow travels further downstream. The bends (e.g., bend 178E), which may be downstream from cooling augmentation features 200, provide desirable locations to resupply the serpentine cavity 178 with cooling fluid by avoiding disrupting the high heat transfer developed flow in the longer passages. Because the flow has to turn and disrupt this developed flow to some extent regardless, the turn is a good location to introduce higher pressure air while maintaining optimal heat transfer in the longer channels.

Figure 4B:
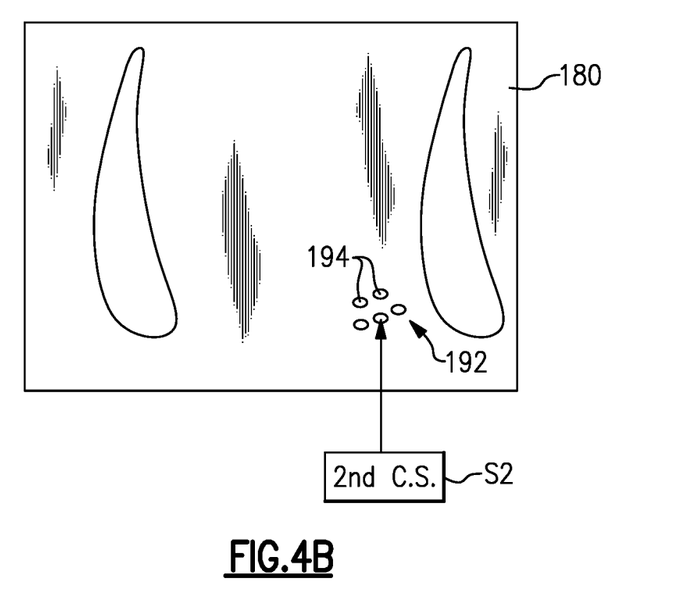

In a non-limiting embodiment, the cover plate 180 may include one or more openings provided by a cluster of holes 194 that extend through the cover plate 180 to serve as a second inlet 192 to resupply a low pressure region 196 of the serpentine cavity 178. In the example, the resupplied low pressure region 196 corresponds with the bend 178E. The second inlet 192, which is downstream from the first inlet 190, is fed by a second cooling fluid from the second cooling source S2. In this manner, the high pressure compressor section 52 and two of its first and second compressor stages respectively provide bleed air supplying the first and second cooling fluids. Since the first compressor stage has a higher pressure than the second compressor stage, the second cooling fluid will be at a lower pressure and temperature than the first cooling fluid. But, the second cooling fluid is at a higher pressure than the pressure at the low pressure region 196. Cooling fluid may exit the serpentine cavity 178 in any suitable location, for example, at one of the opposing mate faces 160, 162. Thus, when the second cooling fluid is introduced into a region that has dropped sufficiently in pressure, the benefits of both a temperature reduction as well as a pressure increase are realized.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the embodiments of the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine, comprising:
a compressor section includes a high pressure compressor section downstream from a low compressor section, the high pressure compressor section providing first and second compressor stages configured to respectively provide bleed air supplying first and second cooling fluids, the first compressor stage having a higher pressure than the second compressor stage;
a combustor section arranged fluidly between the high pressure compressor section and a turbine section having a low pressure turbine downstream from a high pressure turbine, and a core flow path that extends through the compressor section, the combustor section and the turbine section;
a low speed spool includes an inner shaft that interconnects the low pressure compressor and the low pressure turbine, and a high speed spool includes an outer shaft that interconnects the high pressure compressor and the high pressure turbine, the inner and outer shafts mounted for concentric rotation about an engine central longitudinal axis; and
a component arranged in the turbine section and having a platform with an internal cooling passage fed by first and second inlets respectively receiving fluid from the first and second cooling sources, the second inlet downstream from the first inlet,
wherein the internal cooling passage is a serpentine cavity including a bend downstream, the bend having a pressure drop, and the second inlet is arranged downstream of the pressure drop at the bend and configured to resupply the serpentine cavity with the second cooling fluid.

2. The gas turbine engine of claim 1, wherein the component is a turbine vane.

3. The gas turbine engine of claim 2, wherein the turbine vane includes a hollow airfoil configured to receive a third cooling fluid from the compressor section and different from the first and second cooling fluids.

4. The gas turbine engine of claim 2, wherein the turbine vane has a first path side and a second path side, the second path side exposed to the core flow path.

5. The gas turbine engine of claim 4, wherein the turbine vane has longitudinally spaced apart forward and aft rails supporting the platform, the first inlet provided in the forward rail.

6. The gas turbine engine of claim 4, wherein the serpentine cavity includes a plurality of cooling augmentation features.

7. The gas turbine engine of claim 6, wherein the cooling augmentation features include at least one of trip strips, pin fins and chevrons.

8. The gas turbine engine of claim 6, wherein the cooling augmentation features are arranged fluidly between the first and second inlets.

9. The gas turbine engine of claim 4, wherein a cover plate is secured over the serpentine cavity on the first gas path side, the cover plate providing the second inlet.

10. The gas turbine engine of claim 9, wherein the second inlet is provided by a cluster of holes through the cover plate.

11. The gas turbine engine of claim 1, comprising a fan arranged in a bypass duct, and a geared architecture the fan and the low speed spool.

12. The gas turbine engine of claim 11, wherein the geared architecture has a gear reduction ratio is in a range of greater than 2.3:1 to 5:1.

13. The gas turbine engine of claim 11, comprising a bypass ratio in a range of greater than 6 to less than or equal to 18.0.

14. The gas turbine engine of claim 11, wherein the low pressure turbine has a pressure ratio in a range of 5:1 to 13.0:1.

* * * * *